(12) United States Patent
Evoy (10) Patent No.: US 7,673,140 B2
(45) Date of Patent: Mar. 2, 2010

(54) DEDICATED ENCRYPTED VIRTUAL CHANNEL IN A MULTI-CHANNEL SERIAL COMMUNICATIONS INTERFACE

(75) Inventor: David R. Evoy, Chandler, AZ (US)

(73) Assignee: NXP B.V., Eindhoven (NL)

( * ) Notice: Subject to any disclaimer, the term of this patent is extended or adjusted under 35 U.S.C. 154(b) by 980 days.

(21) Appl. No.: 10/539,196

(22) PCT Filed: Dec. 17, 2003

(86) PCT No.: PCT/IB03/06012

§ 371 (c)(1),
(2), (4) Date: Jun. 17, 2005

(87) PCT Pub. No.: WO2004/056031

PCT Pub. Date: Jul. 1, 2004

(65) Prior Publication Data

US 2006/0059213 A1    Mar. 16, 2006

Related U.S. Application Data

(60) Provisional application No. 60/434,796, filed on Dec. 18, 2002.

(51) Int. Cl.
*H04L 9/18* (2006.01)

(52) U.S. Cl. .......................... 713/168; 713/189; 380/33; 725/151

(58) Field of Classification Search .................. 213/153; 326/30; 341/50; 348/473; 361/764; 370/236, 370/244, 254, 282, 310, 331, 352, 362, 368, 370/395, 397, 466; 710/305; 726/12
See application file for complete search history.

(56) References Cited

U.S. PATENT DOCUMENTS 5,425,101 A * 6/1995 Woo et al. .................... 380/212

(Continued)

FOREIGN PATENT DOCUMENTS

EP    0 875 813    11/1998

(Continued)

*Primary Examiner*—William R Korzuch
*Assistant Examiner*—Michael R Vaughan (57) ABSTRACT

A data processing system, circuit arrangement, and method to communicate data over a multi-channel serial communications interface (14) using a dedicated encrypted virtual channel from among multiple virtual channels supported by the communications interface (14). Encryption for the dedicated encrypted virtual channel is provided by a hardware encryption circuit (34) that is coupled to the interface, such that encryption may be performed at a relatively low level, and with substantial protection from compromise, particularly along chip boundaries. In one particular application, access control may be provided for a digital data stream using a multi-chip access control scheme that relies on one chip (148) to provide access control over a received digital data stream, with another chip (150) utilized to process the digital data stream once authorized to do so. A secure, multi-channel serial communications interface between the multiple chips re-encrypts a digital data stream that has been decrypted on the access control chip (148) using hardware encryption logic (162) disposed on the access control chip (148), communicates the re-encrypted digital data steam over a dedicated encryption virtual channel supported by the multi-channel serial communications interface, and decrypts the re-encrypted digital data steam using hardware decryption logic (164) disposed on the other chip (150).

20 Claims, 8 Drawing Sheets

U.S. PATENT DOCUMENTS

| | | | |
|---|---|---|---|
| 6,141,324 A * | 10/2000 | Abbott et al. | 370/236 |
| 6,457,091 B1 * | 9/2002 | Lange et al. | 710/314 |
| 6,845,446 B1 * | 1/2005 | Fuller | 713/153 |
| 2003/0081391 A1 * | 5/2003 | Mowery et al. | 361/764 |
| 2004/0060060 A1 * | 3/2004 | Carr | 725/31 |

FOREIGN PATENT DOCUMENTS

| | | |
|---|---|---|
| EP | 0 952 733 | 4/1999 |

* cited by examiner

DEDICATED ENCRYPTED VIRTUAL CHANNEL IN A MULTI-CHANNEL SERIAL COMMUNICATIONS INTERFACE

CROSS REFERENCE TO RELATED APPLICATION

This application claims the benefit of U.S. provisional application Ser. No. 60/434,796 filed Dec. 18, 2002, which is incorporated herein by reference.

BACKGROUND OF THE INVENTION

1) Field of the Invention

The invention is generally related to data communication and data encryption. In particular, the invention is related to the encryption of data communicated over a multi-channel serial communications interface.

2) Description of the Related Art

Security management has become increasingly important to protect digital data from unauthorized access. In many instances, security management is utilized to maintain the confidential nature of a secured communication such that only an intended recipient can view the information. Moreover, security management has also become critically important in connection with digital rights management to limit access to digital content such as movies, music, television broadcasts, etc.

A wide variety of security management schemes currently exist. Many utilize encryption algorithms that effectively scramble digital data prior to communication to a recipient in such a manner that only the recipient can decrypt the data and obtain the information therefrom. Often, encryption is utilized in connection with digital certificates, Public Key Infrastructure (PKI), and the like to ensure that only an authorized recipient can decrypt scrambled data.

Security management is often necessary for a wide variety of different types of communications interfaces. For example, it may be desirable to incorporate security management into serial communications interfaces, which are increasingly used in high performance and high bandwidth applications to communication data in a point-to-point manner between transmitting and receiving modes or endpoints coupled to a serial interconnect. Various protocols, such as Universal Serial Bus (USB), IEEE-1394, and PCI-Express, have been developed for various computing applications.

Among other characteristics, many of the aforementioned serial communications interface standards support the concept of multiplexing data streams from multiple channels onto a single serial interface, typically to support the isochronous transmission of time-dependent data such as audio and video data streams. For example, the PCI-Express standard explicitly supports the concept of virtual channels, which permits such channels to be established between endpoints to permit multiple data streams to be multiplexed over a single interconnect.

The PCI-Express standard is expected to find applicability as a replacement technology for the PCI standard, which has conventionally been used to connect peripheral components to the central processing complex in a computer. Furthermore, the PCI-Express standard may also ultimately be used to replace a number of other interconnect technologies in computers, as well as in other data processing systems such as set top boxes, DVD players, etc.

As with all communications interfaces, PCI-Express-compatible serial interconnects are capable of transmitting encrypted data. However, there is no explicit support in the standard for data encryption. Instead, data is typically encrypted under software direction, such that the data, once it is passed to a PCI-Express-compatible interface, has already been encrypted by an operating system or application software.

Encrypting data intended for communication over a serial interconnect using software, however, has a number of drawbacks. Most notably, software-based encryption and decryption can consume substantial system resources. Moreover, when any computer or data processing system is implemented using multiple integrated circuits, or chips, a possibility exists that decrypted data may be exposed along chip boundaries, i.e., along pathways that interconnect two integrated circuits or chips together in a package or on a circuit board.

The potential pitfalls associated with securing data communicated over a serial interconnect are perhaps best exemplified within the context of digital rights management. The media and entertainment industries, for example, expend a substantial amount of resources attempting to protect content from hackers seeking to access content without the authorization of the content provider. Copy protection has become an important tool utilized by content providers and distributors to prevent unauthorized copying of content. Moreover, as content such as movies, television programs, music, etc. has transitioned to a digital format, the risks of unauthorized copying have increased, as digital copies are often identical in quality to their original content. Therefore, a significant need has existed for a manner of protecting digital content from unauthorized access.

Many of the electronic devices utilized to playback digital content are required to incorporate access control technology to ensure that content is only viewable by authorized users. For example, Direct Broadcast Satellite (DBS) set top boxes and receivers typically incorporate access control technology to ensure that only authorized subscribers are permitted to view content broadcast from DBS satellites. Likewise, DVD players, gaming systems, and the like typically incorporate access control technologies to ensure that the compressed data streams on a DVD disk cannot be used to make copies of the digital content stored thereon. Moreover, many DVDs incorporate regional encoding to permit DVD players that are sold in certain geographic regions to play DVD disks intended for use solely in those geographical regions.

Set top boxes, DVD players, and the like often utilize embedded electronics, including multiple integrated circuits or chips. Furthermore, the volume of data that must be processed in these applications is often significant, thus requiring relatively high bandwidth data communication capabilities. Given the necessity to minimize the cost of these devices, processing resources are often limited, and as such, it is desirable to minimize the overhead associated with performing encryption and/or decryption of digital data streams. Furthermore, the multiple integrated circuits or chips utilized in such devices present potential avenues for the unauthorized access of digital content, simply through monitoring the flow of data between chips along the conductive signal pathways extending between those chips.

Due to the manner in which integrated circuits are manufactured, it is extremely difficult to detect the flow of data internal to an integrated circuit, at least as compared to detecting dataflow between an integrated circuit and other devices. For this reason, it is often desirable to avoid the communication of unencrypted digital content between multiple chips.

One manner of inhibiting the communication of unencrypted digital content between chips is to incorporate access control functionality on the same chip as that utilized to decode and decompress digital data streams. As an example, digital content broadcast by DBS satellites and stored on DVD media is often encoded by a standard known as MPEG. Digital content encoded using the MPEG standard is highly compressed to minimize storage and bandwidth requirements. Prior to display on a television, however, an MPEG data stream must be decoded and decompressed. The resulting decoded data, however, is typically too voluminous to copy, and in the least requires recompression using an MPEG encoder, which degrades quality and renders the resulting copy inferior to the original content.

MPEG data streams communicated by DBS satellites and stored on DVD media are typically encrypted and protected by access control data to permit only authorized devices to decrypt the MPEG data for display to a consumer.

The process of converting a broadcast MPEG data stream to a television or other display device therefore typically involves two separate steps. First, access control functionality is required to decrypt the MPEG data stream once the set top box or DVD player is determined to be authorized to view the content. The result of this decryption operation is a decrypted MPEG data stream. The second operation is MPEG decoding, which takes the decrypted MPEG data stream and decodes and un-compresses the data stream to generate audio and/or video data for output to a television or other display device.

The decrypted data stream that is intermediate these two operations typically represents a compressed, and perfect copy, of the original content. Therefore, to prevent access to this decrypted data stream, the conventional strategy of system designers has been to incorporate access control logic and MPEG decoder logic on the same integrated circuit.

While incorporating access control and MPEG decoding on the same integrated circuit offers a number of advantages in terms of security, there are a number of drawbacks from a business perspective. First, the MPEG standard is utilized in connection with a wide variety of different technologies, including the aforementioned DVD and DBS technologies. In all of these different technologies, a wide variety of different access control mechanisms are required. For DBS technologies, for example, individual subscribers (i.e., the owners of the set top boxes) must be authenticated. For DVD technologies, however, it is typically regional access control that is required. As such, the access control logic utilized in different applications can vary substantially.

While it is technically somewhat trivial to integrate access control circuitry with MPEG decoding circuitry on the same integrated circuit, from a cost perspective, it can be prohibitively expensive to do so. High performance integrated circuit designs can have extremely high startup costs due to the costs associated with developing appropriate masks for use in manufacture. The semiconductor industry is typically reliant on high volumes to recoup the relatively high startup costs for each chip design. As such, even adapting an existing circuit design to incorporate alternate access control circuitry can be an extremely expensive endeavor.

From an economic standpoint, separating access control logic from decoding logic, and utilizing multiple chips to perform the separate functions, would be substantially more cost-effective. Access control circuitry, in particular, can often be implemented using relatively simple circuitry. Furthermore, given the relatively high bandwidth capabilities of serial interconnects and the like, high speed serial interconnects such as PCI-Express-compatible interconnects could be used to communicate data streams between the access control and decoding chips.

It would be highly desirable in many instances to use a common MPEG decoder chip that could be interfaced with multiple types of access control chips to permit the MPEG decoder chip to be used in a wider variety of applications. However, given the justifiable concerns due to hackers intercepting decrypted data streams, multi-chip implementations have not been considered acceptable alternatives.

Therefore, a significant need exists in the art for a more cost-effective manner of providing security management over high speed communication interfaces, including serial and other interconnects utilized in connection with the communication of digital data between integrated circuits and the like. Moreover, a significant need exists in the art for a more cost-effective manner of implementing access control in connection with protecting digital content.

BRIEF SUMMARY OF THE INVENTION

The invention addresses these and other problems associated with the prior art by providing a data processing system, circuit arrangement, and method in which data is communicated over a multi-channel serial communications interface using a dedicated encrypted virtual channel from among multiple virtual channels supported by the communications interface. Encryption for the dedicated encrypted virtual channel is provided by a hardware encryption circuit that is coupled to the interface, such that encryption may be performed at a relatively low level, and with substantial protection from compromise, particularly along chip boundaries. Typically, additional virtual channels may support unencrypted data (and/or data encrypted via other mechanisms, such as via software), thus permitting both encrypted and unencrypted data to share a common interface in a relatively efficient, cost effective and secure manner.

While a number of alternate embodiments are envisioned consistent with the invention, one particular application of the invention is in connection with providing access control for digital data streams, e.g., to support regional and/or subscriber-based access control of digital content in data processing systems such as direct broadcast satellite (DBS) receivers, DVD players, and the like. In contrast with conventional single-chip access control schemes, embodiments consistent with the invention may utilize a multi-chip access control scheme that relies on one chip to provide access control over a received digital data stream, with another utilized to process the digital data stream once authorized to do so. A secure, multi-channel serial communications interface between the multiple chips re-encrypts a digital data stream that has been decrypted on the access control chip using hardware encryption logic disposed on the access control chip, communicates the re-encrypted digital data stream over a dedicated encryption virtual channel supported by the multi-channel serial communications interface, and decrypts the re-encrypted digital data stream using hardware decryption logic disposed on the other chip.

As such, access control functionality may be physically separated from the functionality that ultimately utilizes the digital data stream, while the digital data stream remains secured from unauthorized access across chip boundaries. Among other benefits, the herein-described architecture can save substantial costs in terms of development and manufacture of the individual chips utilized in a multi-chip design.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION OF THE INVENTION

The embodiments discussed hereinafter incorporate a dedicated encrypted virtual channel into a multi-channel serial communications interface such as a PCI-Express-compatible interconnect. A multi-channel serial communications interface consistent with the invention typically incorporates the concept of multiple "virtual" channels that share a common serial communications path. In many protocols, the virtual channels are multiplexed on a common serial communications path, e.g., using time-based multiplexing. For example, in a PCI-Express-compatible communications interface, multiple virtual channels, referred to as "isochronous" channels, are supported, with these multiple channels capable of being individually established and configured through a well-defined protocol.

Consistent with the invention, one or more of the virtual channels for a serial communications interface may be configured as a "dedicated" encrypted virtual channel. A dedicated encrypted virtual channel consistent with the invention typically utilizes hardware-based encryption and/or decryption logic that is disposed on same integrated circuits or chips as the interface circuits utilized to communicate over a multi-channel serial communications interface. Moreover, this hardware-based logic is coupled to the interface circuitry in such a manner that all data that is communicated over the dedicated encrypted virtual channel is encrypted, e.g., via direct signal paths between interface circuitry and the encryption/decryption logic. As such, in many embodiments it is desirable for the encryption of data to be communicated over a dedicated encrypted virtual channel to be incapable of being bypassed or disabled.

It will be appreciated that other virtual channels in a multi-channel serial communications interface may be encrypted or unencrypted, and that the encryption, if any, may be implemented in hardware and/or software. Moreover, while data communicated over a dedicated encrypted virtual channel is always encrypted, other data associated with the establishment of the dedicated encrypted virtual channel, e.g., setup data, control data, authorization data, public keys, etc., may be communicated in an encrypted or unencrypted fashion over another virtual channel.

It will also be appreciated that the invention may be utilized in connection with multi-channel serial communications interfaces other than PCI-Express-compatible interfaces. Therefore, while the hereinafter-described embodiments will focus on one particular application of the invention in connection with a PCI-Express interface, the invention is not limited as such.

In general, it will be appreciated that any of the hardware-based functionality discussed hereinafter is typically implemented in a circuit arrangement incorporated into one or more integrated circuits, or chips, and optionally including additional supporting electronic components. Moreover, as is well known in the art, integrated circuits are typically designed and fabricated using one or more computer data files, referred to herein as hardware definition program code, that define the layout of the circuit arrangements on the devices. The program code is typically generated by a design tool and is subsequently used during manufacturing to create the layout masks that define the circuit arrangements applied to a semiconductor wafer. Typically, the program code is provided in a predefined format using a hardware definition language (HDL) such as VHDL, verilog, EDIF, etc. While the invention has and hereinafter will be described in the context of circuit arrangements implemented in fully functioning integrated circuits and data processing systems utilizing the same, those skilled in the art will appreciate that circuit arrangements consistent with the invention are also capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links. Moreover, in some embodiments consistent with the invention, other integrated circuit technologies, e.g., FPGA's and the like may also be used to implement some of the hardware-based functionality discussed herein.

Figure 1:
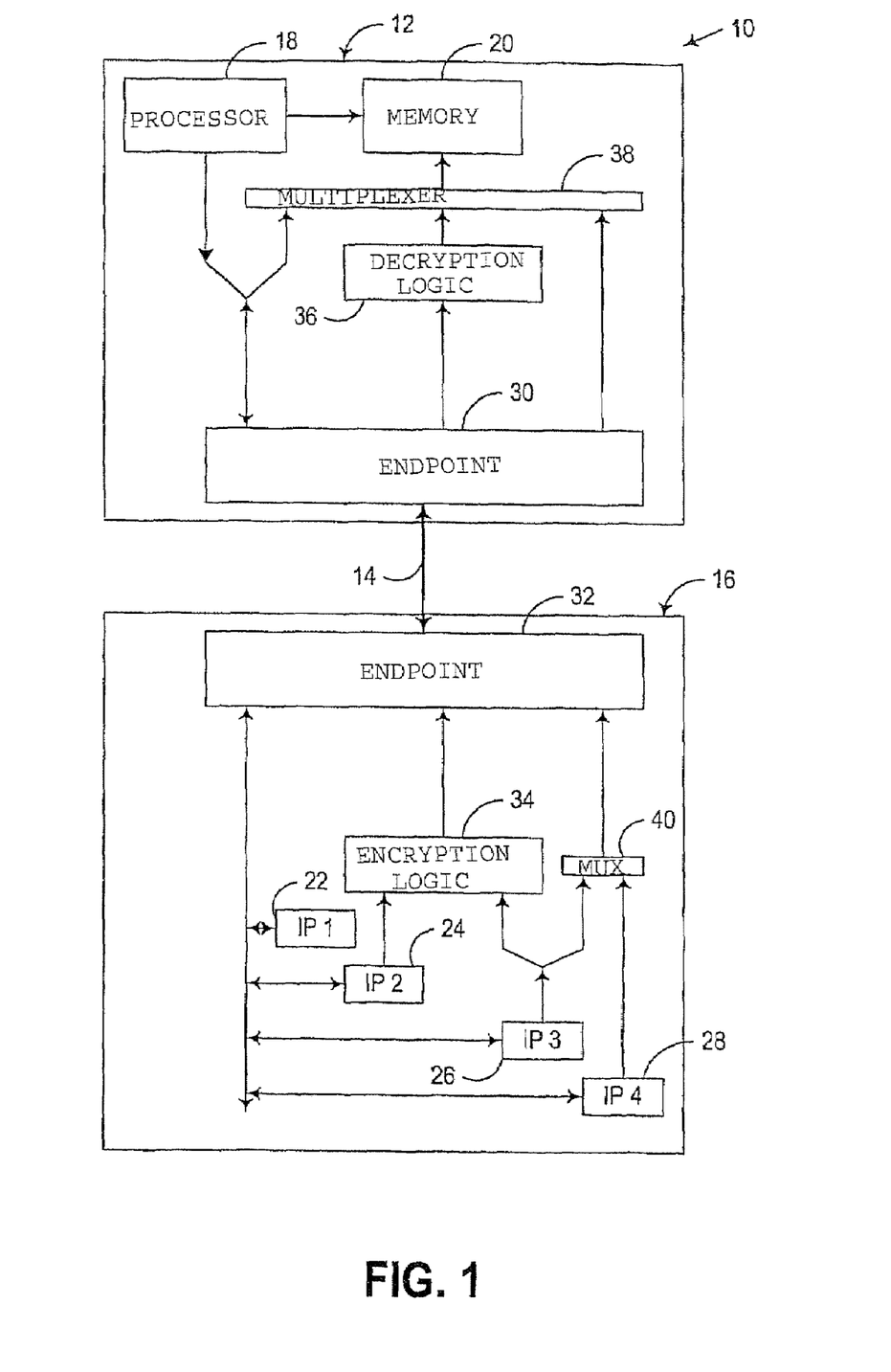
FIG. 1 is a block diagram of a data processing system incorporating a multi-channel serial communications interface having a dedicated encrypted virtual channel consistent with the invention.

Now turning to the Drawings where like numbers denote like parts throughout the several views, FIG. 1 illustrates an exemplary data processing system 1 0 incorporating the multi-channel serial communications interface with a dedicated encrypted virtual channel consistent with the invention. Data processing system 10 includes a host device 12 coupled via a multi-channel serial interconnect 14 to a peripheral device 16. Devices 12, 16 may be disposed on the same or different integrated circuits in different embodiments, and may even be disposed on separate circuit boards, packages, housings, etc. Moreover, it will be appreciated that other devices may be coupled to a multi-channel serial interconnect consistent with the invention. In the illustrated embodiment, interconnect 14 is a PCI-Express-compatible interconnect. As such, devices 12, 16 may be coupled by a point-to-point connection, or intermediate devices, e.g., a bridge or switch, may also be utilized between devices 12, 16.

In this illustrative design, host device 12 is illustrated as including a processor 18 and memory 20, while peripheral device 16 is illustrated as including a plurality of logic blocks, 22; 24, 26, 28, representing various logic circuits that may be present on a peripheral device. Consistent with industry terminology, these logic blocks may be referred to as Intellectual Property (IP) blocks, representative of self-contained designs that may be assembled with other circuitry on an integrated circuit. It will be appreciated, however, that practically any logic circuitry may be disposed on either of host device 12 or peripheral device 16 consistent with the invention.

Also in this illustrative data processing system, an exemplary configuration suitable for communicating secured data from peripheral device 16 to host device 12 is illustrated. Each device 12, 16 includes a multi-channel serial endpoint circuit 30, 32, which is configured to multiplex a plurality of virtual channels (channels 0-2 are illustrated in FIG. 1 for exemplary purposes) over multi-channel serial interconnect 14. Given the implementation of data processing system 10 using the PCI-Express protocol, circuits 30, 32 may each comprise standard PCI-Express-compatible IP blocks. In other designs, however, customized endpoint circuitry may be used in the alternative.

Data processing system 10 supports the concept of a dedicated encrypted virtual channel, here virtual channel 1, for communicating data in a secure manner from peripheral device 16 to host device 12. In this regard, peripheral device 16 includes hardware encryption logic 34 that is configured to couple to a channel 1 interconnect or input to endpoint 32. Typically, encryption logic 34 is coupled via a direct signal path to the channel 1 interconnect of endpoint 32, and is the only connection to the channel 1 interconnect, thus ensuring that only encrypted data is communicated over channel 1 of the multi-channel serial interconnect.

A corresponding hardware-based decryption logic circuit 36 is disposed in device 12, and coupled to the channel 1 interconnect or output for endpoint 30. As such, decryption logic 36 decrypts any encrypted data sent over the virtual channel 1 of the multi-channel serial interconnect. Furthermore, to provide a common pathway into memory 20, a multiplexer 38 is provided to couple the output of decryption logic 36, as well as any other virtual channels to memory 20.

To implement a dedicated encrypted virtual channel consistent with the invention, encryption logic 34 and decryption logic 36 may be designed to support practically any encryption/decryption algorithm, including, for example, PKI, RSA DES and Triple DES, etc. It will be appreciated that additional data, such as access or control data and/or public key information may be communicated to either of blocks 34, 36 either over the dedicated encrypted virtual channel, or in the alternative, over another channel.

For example, virtual channel 0 may be a default channel over which control and access information is communicated. As such, it may be desirable to couple each IP block 22, 24, 26, and 28 to channel 0 to support the ability for each of these blocks to be appropriately configured by the host device, e.g., via commands issued over virtual channel 0 by processor 18. Moreover, it may be desirable to further couple channel 0 to encryption logic 34 (e.g., via a write-only path as shown in FIG. 1) to permit a dedicated encrypted virtual channel to be established, e.g., by forwarding a public key for decryption logic 36 to encryption logic 34.

In this illustrative example, a number of variations are shown. For example, as noted above, virtual channel 0 may be established as a default channel, while virtual channel 1 may be established as a dedicated encrypted virtual channel over which only encrypted data is communicated. Channel 2, on the other hand, may be a conventional virtual channel, which may carry encrypted and/or un-encrypted data as desired.

Moreover, it can be seen by virtue of the various IP blocks 22, 24, 26, and 28 that the logic blocks in device 16 may be coupled to different channels to support different functionality. IP block 22, for example, may be considered a normal best effort device, over which communication is limited to default channel 0. IP block 24, on the other hand, is coupled solely to encryption logic 34, and as such, the only communication between block 24 and device 12 is over the encrypted virtual channel. Block 24 is also illustrated as being coupled to virtual channel 0; however, it may be desirable in many embodiments to limit such access to establishment of access control, e.g., to exchange public keys, or to permit the host device to selectively enable the block. As such, in some embodiments, it may be desirable to only provide a unidirectional path from virtual channel 0 to IP block 24, such that IP block 24 is unable to communicate data over virtual channel 0.

Block 26 illustrates logic circuitry that may selectively communicate via dedicated encrypted virtual channel 1 or virtual channel 2. Likewise, block 28 illustrates a logic block that transfers data solely over virtual channel 2, and without the use of encryption via encryption logic 34. To support the utilization of virtual channel 2 by multiple logic blocks, a multiplexer illustrated at 40 or other routing logic may be used in the alternative.

It will be appreciated that, in the configuration shown in FIG. 1, and with each of interface circuits 30, 32 utilizing a conventional PCI-Express IP block, all of the payload modifications necessary to implement a dedicated encrypted virtual channel may be implemented external to circuits 30, 32. As such, a dedicated encrypted virtual channel may be implemented without any modification to the PCI-Express standard.

To establish a dedicated encrypted virtual channel, a virtual channel must be initialized in accordance with PCI-Express protocols for establishing virtual channels. It will be appreciated that the implementation of suitable logic for initializing a suitable number of virtual channels, as well as for initializing the encryption and authorizing decryption of an encrypted data stream over a dedicated encrypted virtual channel are well within the abilities of one of ordinary skill in the art having the benefit of the instant disclosure. It will also be appreciated that a multi-channel serial interconnect consistent with the invention may utilize any number of virtual channels, as well as any number of dedicated encrypted virtual channels, as may be desirable for any particular application.

In a dedicated encrypted virtual channel consistent with the invention, all data communicated over the virtual channel is encrypted. It will be appreciated that, in implementations where public keys are utilized in association with access control, these public keys can be updated from time to time, and different encryption schemes may be selected in some embodiments. Nonetheless, it is desirable in many embodiments to incorporate a default encryption scheme that cannot be bypassed on a particular dedicated channel. By doing so, and by also providing additional channels for communicating non-encrypted data (or data that has been encrypted via software), a common bus resource may be shared for multiple usages, often lowering costs, and allowing for increased flexibility in what portion of data is encrypted. Moreover, as will become more apparent below, when the endpoints of a multi-channel serial interconnect are disposed on separate integrated circuits, the security of the encrypted data is substantially improved.

It will also be appreciated that the encryption of a dedicated encrypted virtual channel may be supplemental to other manners of encoding or otherwise modifying data communicated over a multi-channel serial interconnect. For example, the PCI-Express protocol scrambles all data communicated over a link, principally for the purpose of spreading the spectrum of electrical noise that is generated across a wider frequency range and thereby reducing peak emissions. While this form of scrambling might be considered as a form of encryption, the purpose of this scrambling is not to protect digital rights, and in fact is relatively easy to decode given that the decoding algorithm is publicly known. Channel-specific encryption in the manner described herein thus provides substantially greater security in a PCI-Express environment than is otherwise provided by the standard.

Figure 2:
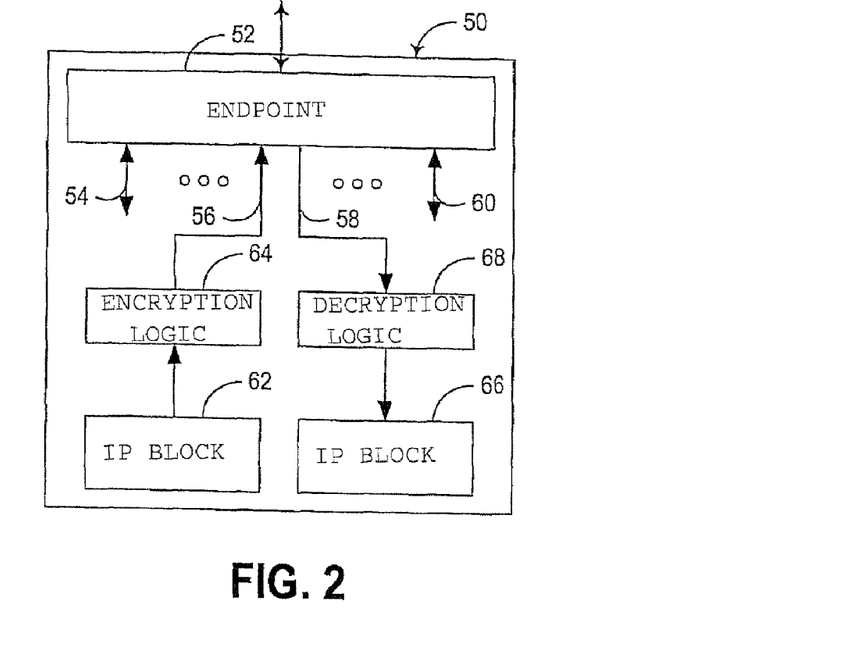
FIGS. 2-5 are block diagrams illustrating exemplary alternate configurations of logic blocks, hardware encryption logic and hardware decryption logic in a multi-channel serial communications interface consistent with the invention.

A wide variety of alternate designs may be used consistent with the invention. For example, as illustrated in FIGS. 2-5, an IP block may be coupled to a multi-channel serial endpoint in a number of alternate manners. For example, as illustrated in FIG. 2, an integrated circuit 50 may include a multi-channel serial endpoint 52 including multiple virtual channels 54, 56, 58, and 60. Virtual channels 56 and 58 may be configured as dedicated encrypted virtual channels. An IP block 62 may be coupled via encryption logic 64 to virtual channel 56 to communicate encrypted data over virtual channel 56 in the manner described above. Likewise, encrypted virtual channel 58 may receive encrypted data from the serial interconnect for consumption by IP block 66, with decryption of the encrypted data stream provided by decryption logic 68. As such, it can be seen that both encryption and decryption may be supported on the same integrated circuit.

Figure 3:
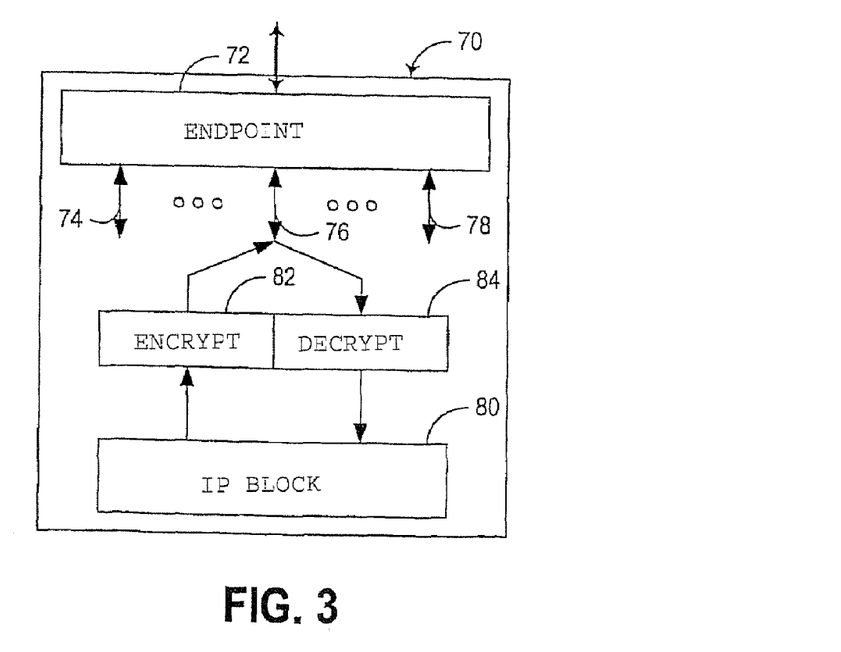
Figure 4:
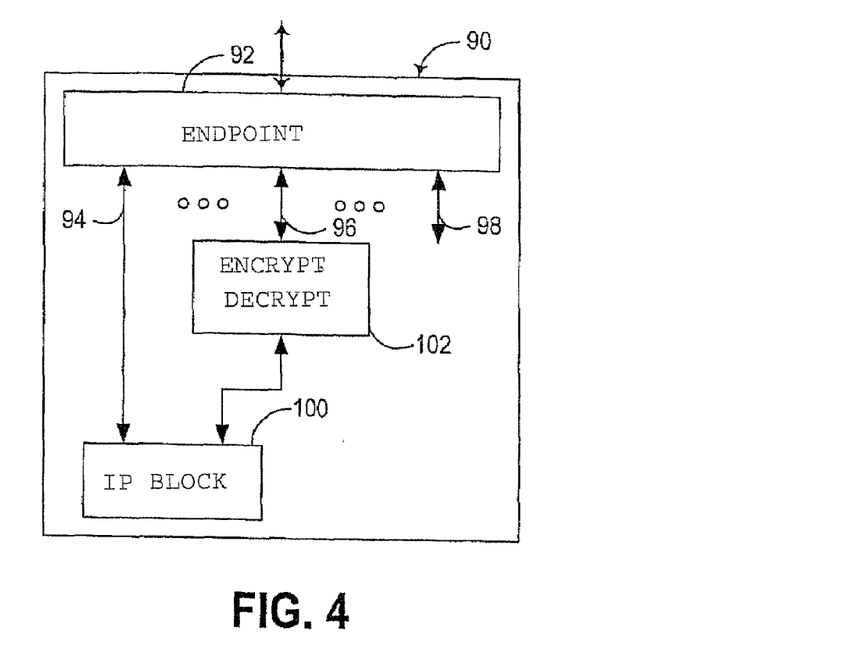

While virtual channels 56, 58 are illustrated as unidirectional in nature, it will be appreciated that a virtual channel consistent with the invention may also be bi-directional in nature. As shown in FIG. 3, for example, the integrated circuit 70 may include a multi-channel serial endpoint 72 that supports a plurality of virtual channels 74, 76, and 78. Virtual channel 76 may be configured as a dedicated encrypted virtual channel that is bi-directional in nature. As such, an IP block 80 may be both a producer and a consumer of encrypted data. To support such functionality, encryption logic 82 may be disposed intermediate block 80 and endpoint 72 to encrypt outgoing data destined for the serial interconnect. Likewise, for incoming encrypted data, decryption logic 84 may be coupled intermediate IP block 80 and endpoint 72.

As was also mentioned above, and is further illustrated in FIG. 4, an IP block disposed on an integrated circuit may be capable of communicating over multiple virtual channels. Integrated circuit 90 of FIG. 4, for example, includes a multi-channel serial endpoint 92 that supports a plurality of virtual channels 94, 96, and 98, with virtual channel 94 being an un-encrypted channel, and virtual channel 96 being a dedicated encrypted virtual channel. An IP block 100 may communicate over either of channels 94, 96, with encryption and/or decryption logic, represented at 102, interposed between IP block 100 and endpoint 92 to support the encryption and/or decryption of encrypted data communicated over the dedicated encrypted virtual channel.

Figure 5:
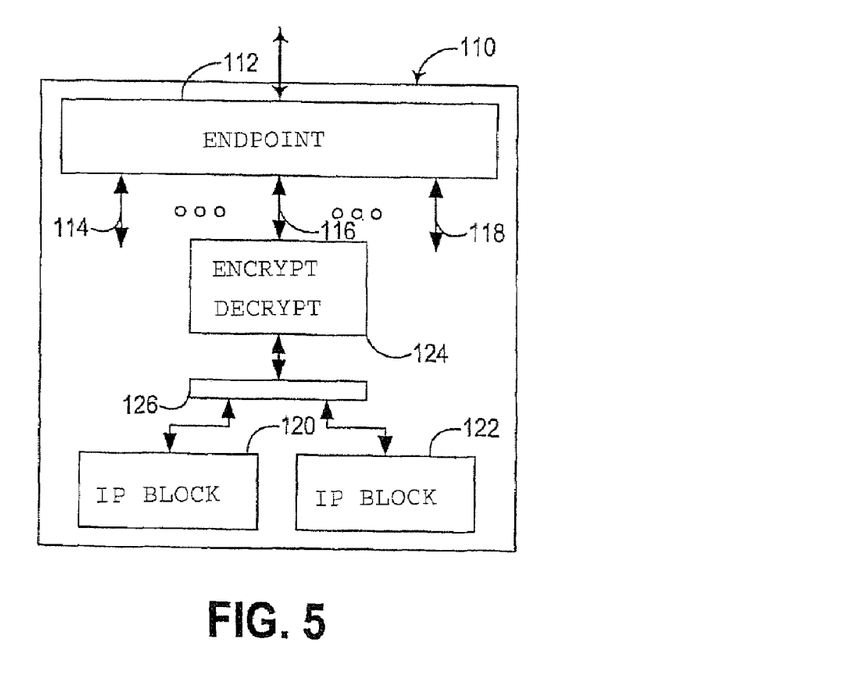

In addition, as illustrated in FIG. 5, multiple IP blocks may share a given dedicated virtual channel. Integrated circuit 110 of FIG. 5, for example, illustrates a multi-channel serial endpoint 112 supporting a plurality of virtual channels 114, 116, and 118. Virtual channel 116 is configured as a dedicated encrypted virtual channel, and multiple IP blocks 120, 122 are coupled via encryption and/or decryption logic 124 to virtual channel 116 to facilitate the secure communication of data with such blocks. An optional multiplexer 126 or other switching logic may be utilized to interface multiple IP blocks with an encrypted virtual channel consistent with the invention.

Figure 6:
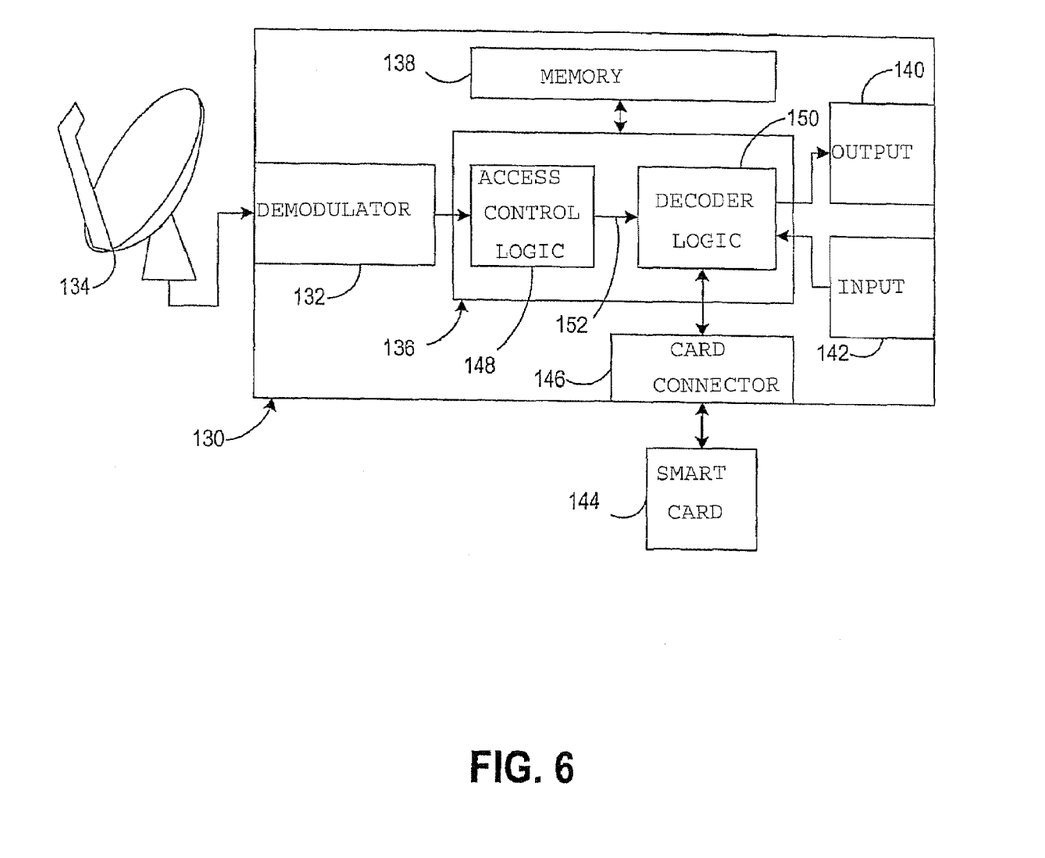
FIG. 6 is a block diagram of a direct broadcast satellite receiver incorporating a processor chipset utilizing a multi-channel serial communications interface consistent with the invention.

FIG. 6 next illustrates one specific application of the herein-described multi-channel serial interconnect, for use in providing access control in a data processing system such as a DBS set top box or receiver 130. As with a conventional DBS set top box, tuner/demodulator logic 132 is provided in the set top box to demodulate a satellite signal received from a satellite dish generically represented at 134, typically from an LNB down converter. The DBS broadcast signal is demodulated to a digital data stream that is encrypted to provide access control and prevent unauthorized access to the digital data stream. This encrypted data stream is provided to a controller for the set top box, here represented by a processor chip set 136. Chip set 136 is further coupled to a memory 138, as well as audio/video output circuitry 140 used to drive a video display and/or external audio circuitry. Moreover, user input, e.g., via front panel buttons and/or a remote control is provided to the processor chip set 136 by user input circuitry generically represented at 142. Furthermore, access control functionality is supported via the use of an access or smart card 144, coupled to the processor chip set by an access card connector represent at 146.

As is well known in the art, DBS set top boxes are conventionally provided with smart card connectors to enable individual units to be separately authorized according to subscription settings for a particular subscriber. Access cards are typically associated with specific subscriber accounts such that authorization may be closely monitored and controlled.

As noted above, conventional DBS set top box designs typically incorporate both access control and decoding of DBS satellite signals in the same integrated circuit. In contrast, set top box 130, and in particular processor chip set 136, utilizes a pair of integrated circuits 148, 150, with integrated circuit 148 providing access control logic, and integrated circuit 150 providing the decoder logic, as well as additional processing and control logic for managing the overall operation of the set top box. Consistent with the invention, a multichannel serial interconnect 152, incorporating a dedicated encrypted virtual channel, couples integrated circuits 148, 150 to one another. As will be discussed below, the digital data stream representative of the DBS broadcast signal is communicated between the chips in an encrypted fashion to protect the digital data stream along the chip boundary between integrated circuits 148, 150.

Figure 7:
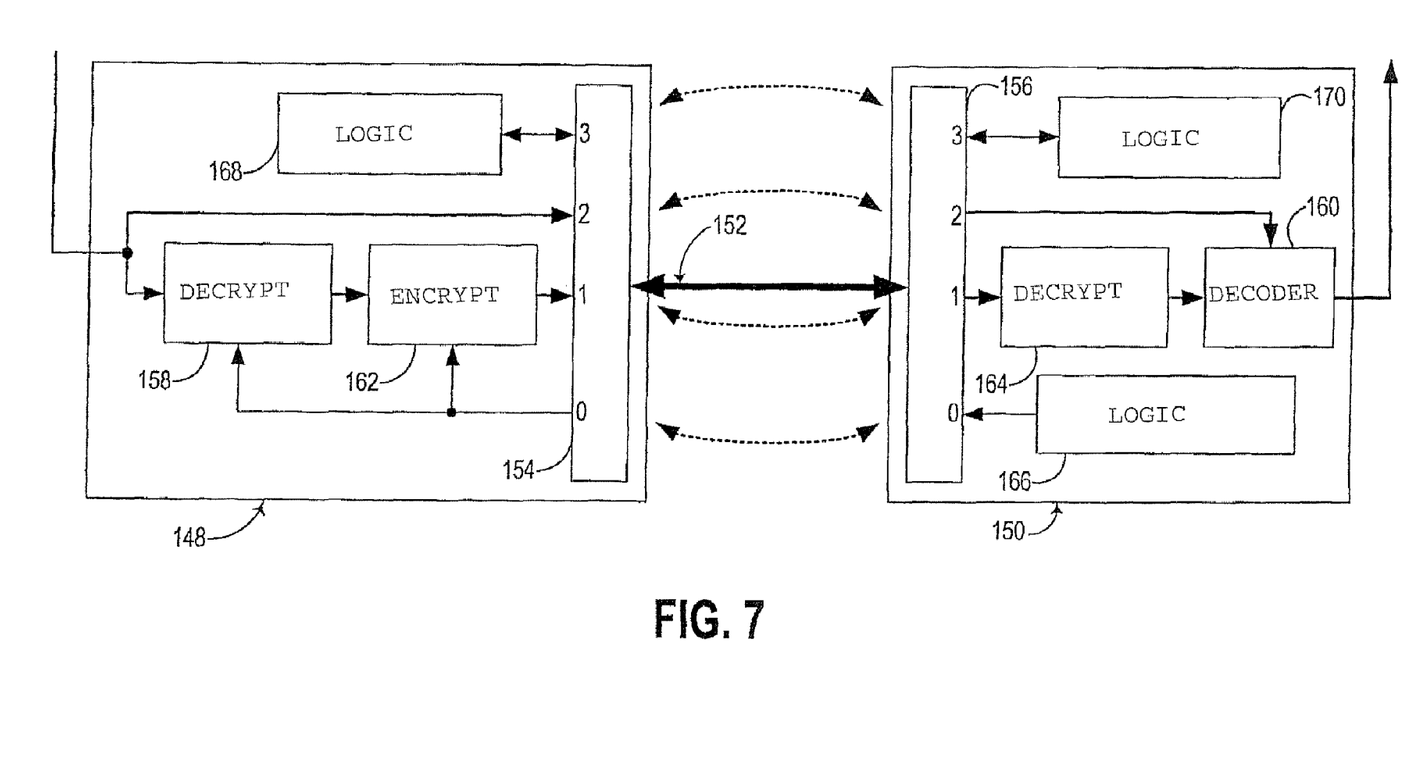
FIG. 7 is a block diagram of the processor chipset of FIG. 6.

Specifically, as illustrated in greater detail in FIG. 7, multichannel serial interconnect 152 may be configured as a PCI-Express interconnect, with four virtual channels diagrammatically shown for the purposes of illustration. Virtual channel 0 may be a default, fixed channel that is required to communicate clear data for the purposes of controlling various operations between integrated circuits 148 and 150, e.g., establishing access control for any dedicated encrypted virtual channels. Virtual channel 1 is illustrated as being a fixed and dedicated encrypted virtual channel, while virtual channels 2 and 3 are illustrated as being flexible channels that may be configured for communicating encrypted or un-encrypted data as may be desirable in different applications. To support the multiple channels, integrated circuit 150 includes PCI-Express serial interface circuits 154, 156, having support for at least four channel interconnects for communicating virtual channel data with other logic circuitry on the respective chip.

To support the secure reception of authorized DBS programming, integrated circuit 148 includes a subscriber-specific decryption logic block 158 that implements the desired access control functionality for the set top box. Likewise, to support decoding of a compressed data stream into uncompressed audio and/or video data, integrated circuit 150 includes an MPEG decoder logic block 160.

To ensure the chip boundary between integrated circuits 148, 150 is secure, the data stream (here a data stream of compressed, but decrypted MPEG data) is communicated over dedicated encrypted virtual channel 1, and in this regard, platform specific encryption and decryption logic 162, 164 is respectively disposed on each integrated circuit 148, 150. To establish suitable access control, as well as to establish a secure connection between integrated circuits 148, 150, integrated circuit includes a logic block 166, coupled to virtual channel 0 and configured to communicate control, status, access and key generation data for consumption by integrated circuit 148.

As also illustrated in FIG. 7, in some embodiments, a compressed data stream may include un-encrypted, or un-restricted data. In such instances, it may be desirable to provide the compressed data stream also to virtual channel 2 and directly to MPEG decoder block 160. It will be appreciated that such data would not be subjected to access control measures, nor would be encrypted when communicated over serial interconnect 152.

It will also be appreciated that additional IP logic, generically represented at block 168 and 170, may also be disposed on each integrated circuit to communicate over additional virtual channels such as virtual channel 3. Additional logic, including much of the processing and control logic for the set top box, may also be incorporated into either or both of integrated circuits 148, 150, or additional integrated circuits disposed in the processor chip set. Such additional functionality would be well understood by one of ordinary skill in the art, and therefore is omitted from FIG. 7.

As configured, a compressed, access controlled data stream is received by block 158, representing an encrypted data stream. Once authorized and decrypted as appropriate by block 158, the resulting decrypted data stream is provided to block 162 to perform platform-specific encryption. This encrypted data stream is then provided over the dedicated encrypted virtual channel for decryption by block 164. At the chip boundary between integrated circuits 148, 150, it will be appreciated that the data communicated over the chip boundary is encrypted, and thus incapable of being compromised. Block 164 then decrypts the data stream in a complementary manner to the encryption provided by block 162, and provides this now decrypted, yet still compressed data stream to MPEG decoder block 160. Block 160 then decompresses and decodes the data stream, in a conventional manner, resulting in the generation of uncompressed audio and/or video data for output from the set top box.

A number of advantages are obtained by this configuration. First, access control and decoding functionality are separated into two separate integrated circuits, allowing different access control algorithms to be utilized with different decoding algorithms through combining different chip designs as desired.

Moreover, as access control functionality is often capable of being implemented in relatively simple logic circuitry, it may be possible in some embodiments to implement integrated circuit 148 using field programmable logic such as an FPGA. As such, the access control logic of integrated circuits may be constructed in an extremely cost-efficient and highly customizable manner, and without requiring expensive modifications to pre-existing chip designs.

Figure 8:
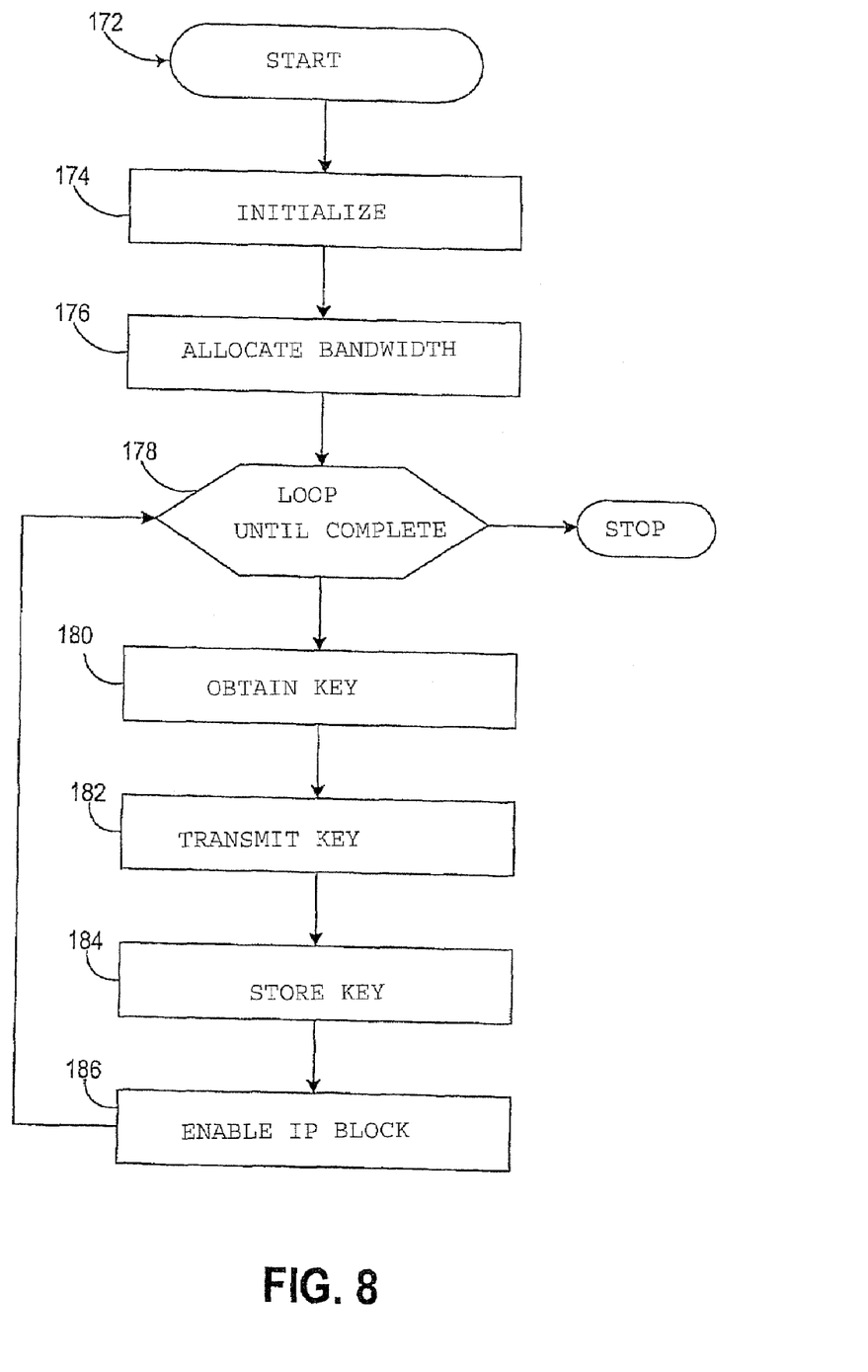
FIG. 8 is a flowchart illustrating an exemplary interconnect initialization routine utilized to establish secure communications over the multi-channel serial communications interface illustrated in FIGS. 6 and 7.

It will be appreciated that the initialization of virtual channels and the establishment of dedicated encrypted virtual channels may vary depending upon the serial communications protocol and encryption algorithms utilized in a given design. FIG. 8, for example, illustrates one exemplary routine that may be performed for the circuitry of FIG. 7 to initialize a multi-channel serial interconnect, and in connection therewith, establish a suitable dedicated encrypted virtual channel.

In particular, FIG. 8 illustrates an initialize interconnect routine 172 that may be executed, for example, under the direction of a device that functions as the host for a multi-channel serial interconnect such as PCI-Express. Routine 172 may be triggered, for example, by the power on of the data processing system. It is assumed that, at this point, all interconnect registers are typically reset.

Routine 172 begins in block 174 by initializing the bus architecture, including establishing a default virtual channel (virtual channel 0), typically in accordance with the known PCI-Express protocol. During this initialization process, link communication is established via hardware, and typically without host processor intervention, to allow the first communications to occur across the channel. At the end of this phase, only configuration cycles from the host processor are supported. All links between endpoints, i.e., the individual point-to-point connections between the host, peripherals, switches, bridges, etc., are typically able to reach this state with no assistance from the host processor.

Once link communication is established, configuration cycles are performed by the host processor to configure all switches and endpoints to set up the overall bus architecture, again pursuant to the PCI-Express protocol. By doing so, memory and I/O spaces are enabled as appropriate. At this point, memory operations are now possible, so individual IP blocks in peripheral devices can read and write memory space in the host device. Individual IP blocks in the host device can also read and write memory space in peripheral devices. However, at this point in the configuration process virtual channels other than default channel 0 are not enabled, so some peripheral devices and/or IP blocks may not be available. Moreover, dedicated encrypted virtual channels are not yet established.

Next, as shown in block 176, bandwidth is allocated for each additional virtual channel desired for a particular multi-channel serial interconnect. In particular, software executing on a host processor typically may be used to set up the desired virtual channels in accordance with the PCI-Express protocol, using default channel 0 to set up the bandwidth allocation for all other virtual channels. At this point, isochronous operation is possible, and individual IP blocks in any peripheral devices can typically read and write the memory in the host device using the guaranteed bandwidth of an isochronous transfer, as well as to perform best effort transfers on all channels.

However, at this point, dedicated encrypted virtual channels are still not yet available. In particular, any data received over a dedicated encrypted virtual channel will typically be encrypted with whatever key the hardware encryption logic for that channel is initialized to use after Power On Reset (POR). This key will not be the public key for the corresponding hardware decryption logic for the dedicated encrypted virtual channel, so any data transmitted over the channel will not be decipherable by the hardware decryption logic.

As such, block 178 initiates a loop to set up the cryptography, and thus authorize secure communications, for each dedicated encrypted virtual channel. For each such channel, block 180 obtains the key for the hardware decryption logic for that channel. This is a public key, and typically does not require protection. How this key is obtained and the number of keys, length of each key, and encryption algorithm used, can differ depending upon system requirements. One possible method is for software running on the host processor to read this key from a register in the decryption logic. Alternatively, the key may be encoded as a constant in software. For example, the encryption and decryption keys for the decryption logic may be software generated, with the private key for the decryption unit loaded into the decryption logic and the public key that pairs with this private key somehow made available to software, e.g., via storage in a dedicated register accessible to the software.

Next, as shown in blocks 182 and 184, the public key is communicated over default virtual channel 0 and stored in the encryption logic for the dedicated encrypted virtual channel. In particular, using channel 0 configuration cycles, the public key of the decryption logic is written to the hardware encryption logic in a peripheral device, thus providing the necessary keys to allow the hardware encryption logic to encode the data in a way that only the hardware decryption logic for that dedicated encrypted virtual channel can properly decrypt the data.

Once the hardware encryption logic has been updated with the public key of the corresponding hardware decryption logic, future data communications over the dedicated encrypted virtual channel are encrypted using that key. As such, and as shown in block 186, any IP blocks that rely on the dedicated encrypted virtual channel may then be enabled, whereby any communication by those blocks over the dedicated encrypted virtual channel will be capable of being decrypted by the decryption logic.

Upon completion of block 186, control returns to block 178 to process establish secure communications over any additional dedicated encrypted virtual channels. Once all such channels have been established, routine 172 is complete.

It should be noted that routine 172 may vary in different applications. For example, given that some IP blocks may be permitted to communicate over multiple virtual channels in some embodiments, it may be desirable to enable IP blocks only after all dedicated encrypted virtual channels have been established. Other initialization routines, suitable for other security protocols and/or serial interconnect architectures, may be used consistent with the invention.

Now returning briefly to FIG. 6, it will be appreciated that chips 148, 150 in DBS receiver 130 are typically disposed on the same circuit board, or potentially within the same multi-chip package or module, whereby the multi-channel serial interconnect 152 is typically disposed on a circuit board. In the alternative, it may be desirable to incorporate a multi-channel serial communications interface that extends between multiple circuit boards. For example, as shown in FIG. 9, it may be desirable to incorporate access control functionality in a "smart" access card incorporating an on-board logic chip coupled to a central controller by a multi-channel serial interconnect with dedicated encrypted virtual channel.

Figure 9:
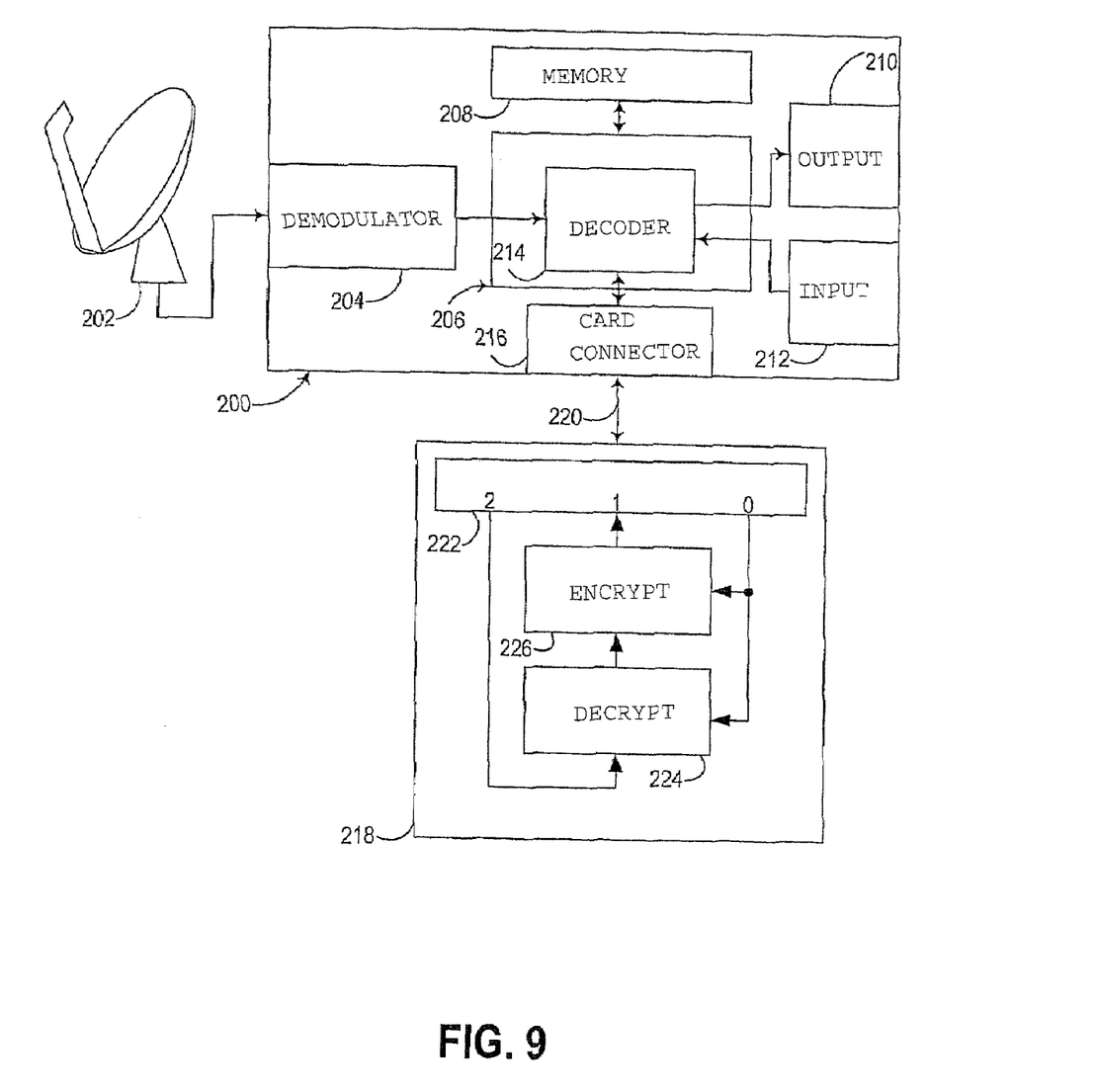
FIG. 9 is a block diagram of an alternate direct broadcast satellite receiver to that of FIG. 6, and incorporating an access card utilizing a multi-channel serial communications interface consistent with the invention.

In particular, FIG. 9 illustrates a DBS receiver 200 that receives a satellite broadcast signal from a satellite dish 202 and demodulates the broadcast signal using tuner/demodulator logic 204 The DBS broadcast signal is demodulated to a digital data stream that is encrypted to provide access control and prevent unauthorized access to the digital data stream. This encrypted data stream is provided to a controller for the set top box, here represented by a processor chip set 206. Chip set 206 is further coupled to a memory 208, as well as audio/video output circuitry 210 and user input circuitry 212.

Within processor chipset 206 is disposed a processor/decoder chip 214. However, instead of incorporating a built-in access control chip within processor chipset 206, an access card connector 216 is configured to accept a smart access card 218 that provides access control functionality and that is coupled to processor chipset 206 via a multi-channel serial interconnect 220.

Disposed on access card 218 is a multi-channel serial interface circuit 222 such as a PCI-Express interface circuit. A subscriber specific decryption block 224 and platform specific encryption block 226, which are configured in a similar manner to blocks 158 and 162 of FIG. 7, are also disposed on the access card.

Interconnect 220 is configured in this embodiment to include three virtual channels, with channel 0 being the default, control channel, channel 1 being a dedicated encrypted virtual channel, and channel 2 being an unencrypted channel. In this embodiment, the compressed, encrypted data stream output by demodulator 204 is provided to block 222 via channel 2 of interconnect 220, with the re-encrypted data stream generated by block 224 returned to the processor chipset over dedicated encrypted virtual channel 1. Of note, the data communicated between set top box 200 and access card 218 is always encrypted, either by the content provider (prior to subscriber-based decryption) or by the DBS receiver (by block 224). Accordingly, the digital data streams are effectively secured and protected from unauthorized tampering.

Among other benefits, the incorporation of the access control functionality in an access card permits access control and digital rights management algorithms to potentially be updated and modified from time to time by a content provider in a relatively cost-effective manner. As such, should a hacker compromise a given access control scheme, another control scheme could be substituted without requiring individual DBS set top boxes to be replaced or modified.

Figure 10:
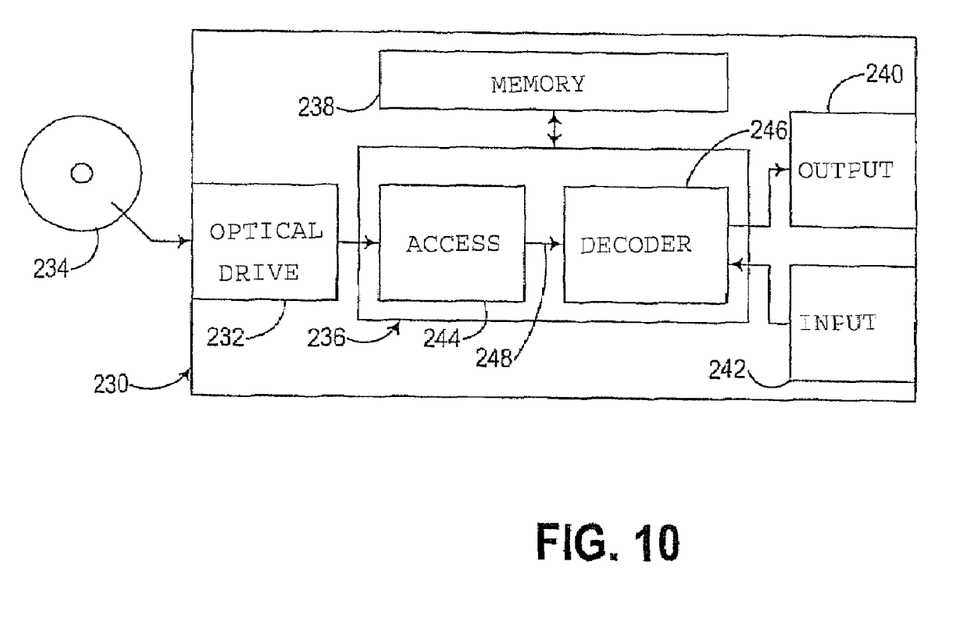
FIG. 10 is a block diagram of a DVD player incorporating a processor chipset utilizing a multi-channel serial communications interface consistent with the invention.

Next, as noted above, the aforementioned access control functionality may be used in connection with data processing systems other than DBS receivers and the like. For example, FIG. 10 illustrates a DVD player 230 including an optical drive circuit 232 configured to read a data stream off of a DVD medium 234, and provide a demodulated, compressed, and encrypted data stream to a processor chipset 236, which is in turn coupled to memory 238, audio/video output circuitry 240 and user input circuitry 242. Chipset 236 includes a regional access chip 244 coupled to a processor/decoder chip 246 by a multi-channel serial interconnect 248 incorporating a dedicated encrypted virtual channel.

It will be appreciated that DVD player 230 may be capable of utilizing the same processor/decoder integrated circuit as either of DBS set top boxes 130, 200 of FIGS. 6 and 9. By utilizing an appropriate region access chip 244, incorporating both regional access logic and the herein-described hardware encryption logic and multi-channel serial interface logic, the same based processor/decoder design used in a DBS set top box may be readily adapted for use in a DVD player.

The herein-described embodiments provide a number of advantages over conventional designs. For example, by using a dedicated encrypted virtual channel, a single communications resource can often be shared for both encrypted and non-encrypted data, thus saving costs. Moreover, as has been shown above, a dedicated encrypted virtual channel can improve the security of encrypted data, particularly across chip boundaries.

Various additional modifications will be apparent to one of ordinary skill in the art having the benefit of the instant disclosure. Therefore, the invention lies in the claims hereinafter appended.

What is claimed is:

1. A multimedia data processing system, comprising:
a first integrated circuit, the first integrated circuit comprising:
   a first logic block receiving an encoded multimedia data stream;
   a hardware encryption circuit coupled to the first logic block, the hardware encryption circuit encrypting the received data stream to generate an encrypted data stream with access control; and
   a first Peripheral Component Interconnect Express (PCI-Express)-compatible interface circuit supporting data communication over a plurality of PCI-Express virtual channels, wherein the plurality of PCI-Express virtual channels comprises at least an unencrypted default virtual channel and a dedicated encrypted virtual channel, wherein the first PCI-Express-compatible interface circuit includes a first plurality of channel interconnects, each channel interconnect associated with a virtual channel among the plurality of virtual channels, wherein a first channel interconnect among the plurality of virtual channels is coupled to the hardware encryption circuit to receive the encrypted data stream, and wherein the first PCI-Express-compatible interface circuit communicates the encrypted data stream from the hardware encryption circuit over the dedicated encrypted virtual channel;
a second integrated circuit coupled to the first integrated circuit by a PCI-Express-compatible interconnect, the second integrated circuit comprising:
   a second PCI-Express-compatible interface circuit coupled to the PCI-Express-compatible interconnect to receive the encrypted data stream over the dedicated encrypted virtual channel, the second PCI-Express-compatible interface circuit comprising:
      a second plurality of channel interconnects, each channel interconnect associated with a virtual channel among the plurality of virtual channels;
      a hardware decryption circuit coupled to a first channel interconnect among the second plurality of channel interconnects for the second PCI-Express-compatible interface circuit and configured to decrypt the encrypted data stream; and
   a second logic block coupled to the hardware decryption circuit decoding the decrypted data stream, the decoding providing the multimedia stream to a subscriber authorized by the access control; and
control logic coupled to at least one of the first and second PCI-Express-compatible interface circuits and configured to communicate authorization data over the default virtual channel to authorize secure communication between the first and second integrated circuits over the dedicated encrypted virtual channel, wherein all data sent over the dedicated encrypted virtual channel are encrypted.

2. The system of claim 1, wherein the first logic block outputs the multimedia data stream for communication over the PCI-Express-compatible interconnect to the hardware encryption circuit such that the multimedia data output by the logic block is encrypted prior to communication over the PCI-Express-compatible interconnect.

3. The system of claim 2, wherein the first logic block outputs additional data for communication over the unencrypted default virtual channel among the plurality of virtual channels.

4. The system of claim 2, wherein the logic block outputs data over the PCI-Express-compatible interconnect solely over the dedicated encrypted virtual channel.

5. The system of claim 2, wherein the second logic block outputs data for communication over the unencrypted default virtual channel among the plurality of virtual channels.

6. The system of claim 2, wherein the second logic block outputs data for communication over the dedicated encrypted virtual channel.

7. The system of claim 2, wherein the hardware decryption circuit decrypts encrypted data communicated over the dedicated encrypted virtual channel.

8. The system of claim 2, wherein the unencrypted default virtual channel communicates authorization data to authorize secure communication over the dedicated encrypted virtual channel.

9. A method of providing access control for a multimedia data stream, the method comprising:
   demodulating an encoded multimedia signal to generate a first encrypted data stream;
   decrypting the first encrypted data stream in a first integrated circuit to generate a first decrypted data stream;
   re-encrypting the first decrypted data stream in the first integrated circuit to generate a second encrypted data stream;
   communicating the second encrypted data stream from the first integrated circuit to a second integrated circuit over a PCI-Express-compatible interface to which the first and second integrated circuits are connected by communicating the second encrypted data stream over a dedicated encrypted virtual channel, among a plurality of virtual channels, the plurality of virtual channels comprising at least an unencrypted default virtual channel and a dedicated encrypted virtual channel, supported by a PCI-Express-compatible interconnect, wherein all data sent over the dedicated encrypted virtual channel are encrypted and wherein access control and decoding are performed separately on the first and second integrated circuits for the dedicated encrypted virtual channel;
   decrypting the second encrypted data stream in the second integrated circuit to generate a second decrypted data stream; and
   decoding the second decrypted data stream to provide the multimedia signal to a subscriber authorized by the access control.

10. The method of claim 9, further comprising:
performing MPEG decoding on the second decrypted data stream, wherein the multimedia signal comprises a satellite broadcast signal, and wherein the first encrypted data stream comprises an encrypted MPEG data stream.

11. The method of claim 9, further comprising:
performing regional access control on the first encrypted data stream.

12. The method of claim 9, further comprising:
performing subscriber access control on the first encrypted data stream.

13. The method of claim 9, further comprising:
disposing the first and second integrated circuits in a set top box.

14. The method of claim 9, further comprising:
disposing the first integrated circuit on an access card coupled to the second integrated circuit via a connector.

15. The method of claim 9, further comprising:
performing re-encryption of the first decrypted data stream with hardware encryption logic disposed on the first integrated circuit.

16. A receiver circuit, comprising:
   demodulation logic generating a first encrypted data stream from an encoded multimedia signal;
   first decryption logic configured to perform access control, to decrypt the first encrypted data stream and to generate a first decrypted data stream, the first decryption logic disposed on a first integrated circuit in a processor chip set;
   encryption logic configured to re-encrypt the first decrypted data stream and generate therefrom a second encrypted data stream;
   second decryption logic decrypting the second encrypted data stream and generating a second decrypted data stream;
   decoder logic on a second integrated circuit in the processor chip set, the decoder logic decoding the second decrypted data stream to provide the multimedia signal to a subscriber authorized by the access control; and
   a first PCI-Express-compatible interface circuit communicating the first and the second encrypted data stream over a PCI-Express-compatible interconnect by communicating the second encrypted data stream over a dedicated encrypted virtual channel, among a plurality of virtual channels, the plurality of virtual channels comprising at least an unencrypted default virtual channel and a dedicated encrypted virtual channel, supported by the PCI-Express-compatible interconnect, wherein all data sent over the dedicated encrypted virtual channel are encrypted, wherein access control and decoding are performed separately on the first and second integrated circuits for the dedicated encrypted virtual channel.

17. The receiver circuit of claim 16, wherein the encoded multimedia signal comprises a satellite broadcast signal, wherein the first encrypted data stream comprises an encrypted MPEG data stream, and wherein decoding the second decrypted data stream in the second integrated circuit comprises performing MPEG decoding on the second decrypted data stream.

18. The receiver circuit of claim 16, wherein the demodulation logic, the encryption logic, and the first PCI-Express-compatible interface circuit are disposed on the first integrated circuit, wherein the second decryption logic is disposed on the second integrated circuit, and wherein the second integrated circuit includes a second PCI-Express-compatible interface circuit coupled to the PCI-Express-compatible interconnect to receive the second encrypted data stream.

19. The receiver circuit of claim 16, wherein the first decryption logic performs regional access control on the first encrypted data stream.

20. The receiver circuit of claim 16, wherein the first decryption logic performs subscriber access control on the first encrypted data stream.

\* \* \* \* \*